(12) United States Patent
Lovett et al.

(10) Patent No.: US 7,640,720 B1
(45) Date of Patent: Jan. 5, 2010

(54) DRAPER BELT CONSTRUCTION TO CONTROL TRANSLATION

(75) Inventors: Benjamin M. Lovett, Colona, IL (US); Bruce A. Coers, Hillsdale, IL (US); Sheldon Grywacheski, Dilworth, MN (US); Corwin M. R. Puryk, East Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/137,196

(22) Filed: Jun. 11, 2008

(51) Int. Cl.
*A01D 43/00* (2006.01)
(52) U.S. Cl. .......................................... 56/181; 56/153
(58) Field of Classification Search .................. 56/1, 56/11.2, 118, 119, 181–188, 257, 264, 268, 56/271, DIG. 1, DIG. 10, DIG. 15, 364; 474/237, 474/242; 198/699, 841, 523
See application file for complete search history.

(56) References Cited

U.S. PATENT DOCUMENTS

| | | | |
|---|---|---|---|
| 3,597,907 A | 8/1971 | Neal, et al. | |
| 3,623,304 A | 11/1971 | Molzahn | |
| 3,717,995 A | 2/1973 | Case | |
| 4,622,803 A | 11/1986 | Lech | |
| 4,724,661 A | 2/1988 | Blakeslee et al. | |
| 5,471,823 A | 12/1995 | Panoushek et al. | |
| 5,577,373 A | 11/1996 | Panoushek et al. | |
| 5,822,959 A * | 10/1998 | Norton | 56/1 |
| 6,041,583 A | 3/2000 | Goering et al. | |
| 6,758,029 B2 | 7/2004 | Beaujot | |
| 6,782,683 B2 * | 8/2004 | Buermann | 56/257 |
| 7,472,533 B2 * | 1/2009 | Talbot et al. | 56/181 |
| 2005/0022491 A1 | 2/2005 | Zurn et al. | |
| 2006/0254241 A1 | 11/2006 | Kempf et al. | |
| 2007/0193243 A1 | 8/2007 | Schmidt et al. | |

* cited by examiner

*Primary Examiner*—Robert E Pezzuto
(74) *Attorney, Agent, or Firm*—Taylor & Aust, P.C.

(57) ABSTRACT

A draper platform includes a frame, a cutter bar, at least one conveyor assembly with two rollers, and a conveyor belt surrounding both rollers. Each of the rollers are mounted to a respective support frame that is independently pivotally mounted to the frame around a transverse axis at its rear end. An assembly for guiding the conveyor belt on the rollers is provided. It includes a ridge on an interior side of the belt and a groove within the roller. The ridge and the groove are provided in the vicinity of the rear end of the rollers.

12 Claims, 5 Drawing Sheets

DRAPER BELT CONSTRUCTION TO CONTROL TRANSLATION

FIELD OF THE INVENTION

The present invention relates to floating platform and draper-type headers for agricultural combines.

BACKGROUND OF THE INVENTION

An agricultural combine is a large machine used to harvest a variety of crops from a field. During a harvesting operation, a header at the front of the combine cuts ripened crop from the field. A feederhouse supporting the header transfers the crop material into the combine. Threshing and separating assemblies within the combine remove grain from the crop material and transfer the clean grain to a grain tank for temporary holding. Crop material other than grain exits from the rear of the combine. An unloading auger transfers the clean grain from the grain tank to a truck or grain cart for transport, or to another receiving bin for holding.

Draper headers are header types commonly used when harvesting crops such as small grains, peas, lentils, and rice. Such draper headers comprise a cutter bar and two or more conveying transversely moving belts arranged in a forward direction behind the cutter bar that convey the cut crop towards the center of the header, where it is fed towards the rear by another conveyor belt assembly that feeds the crop towards a rear outlet of the header and to a feederhouse of the combine. During a harvesting operation with this header type, it is desirable to maintain a cutting height as low as possible to the ground in order to collect substantially the entire ripe crop from the field. To accomplish this, combines typically employ a header float system or a terrain following system to enable the header to follow the ground over changing terrain without gouging or digging into the soil.

U.S. Pat. Nos. 3,717,995, 3,623,304, and 4,724,661 disclose examples of header float systems using resilient structures to suspend the header, thereby reducing the apparent weight of the header, allowing it to lightly skid across the ground over changing terrain. U.S. Pat. Nos. 3,597,907, 4,622,803 and 5,471,823 disclose examples of similar float systems, but using dynamic structures to suspend the header. U.S. Pat. Nos. 5,577,373, 6,041,583 and 6,758,029 B2 disclose examples of terrain following systems using dynamic structures to position the header, thereby sensing and changing the vertical position of the header to follow changing terrain.

Such float systems allow for independent movement of rollers supporting the belt in a vertical direction, such that they can follow the ground contours closely. As a result, problems occur in guiding the belt properly over the roller, since both rollers at the two ends of the belt may move by different distances and even in different directions.

Published patent application US 2005/022491 describes a platform header for a combine with a rigid frame, a cutter bar and three belts arranged side by side for conveying the crop rearward to a transverse auger. The belts comprise at their lateral ends inwardly extending wedges neighboring the side walls of the deflection rollers, in order to prevent the belt from running off the rollers. Published patent application US 2006/254241 A describes a similar platform header in which cover plates between adjacent belts are located in lower positions as the lateral end of the belt, in order to prevent crop or residues from entering between the cover and the belt.

What is needed in the art is a draper header with belts conveying the crop in a transverse direction, allowing appropriate guidance of the belts also when rollers independently move in a vertical direction.

SUMMARY OF THE INVENTION

A draper platform includes a frame, a cutter bar, at least one conveyor assembly with two rollers and a conveyor belt surrounding both rollers. Each of the rollers are mounted to a respective support frame that is independently pivotally mounted to the frame around a transverse axis at its rear end. An assembly for guiding the conveyor belt on the rollers is provided. It includes a ridge on an interior side of the conveyor belt and a groove within the roller. The ridge and the groove are provided in the vicinity of the rear end of the rollers.

Other aspects of the invention are directed towards the conveyor belt per se and towards the assembly for guiding the conveyor belt on the rollers.

DETAILED DESCRIPTION OF THE INVENTION

Figure 1:
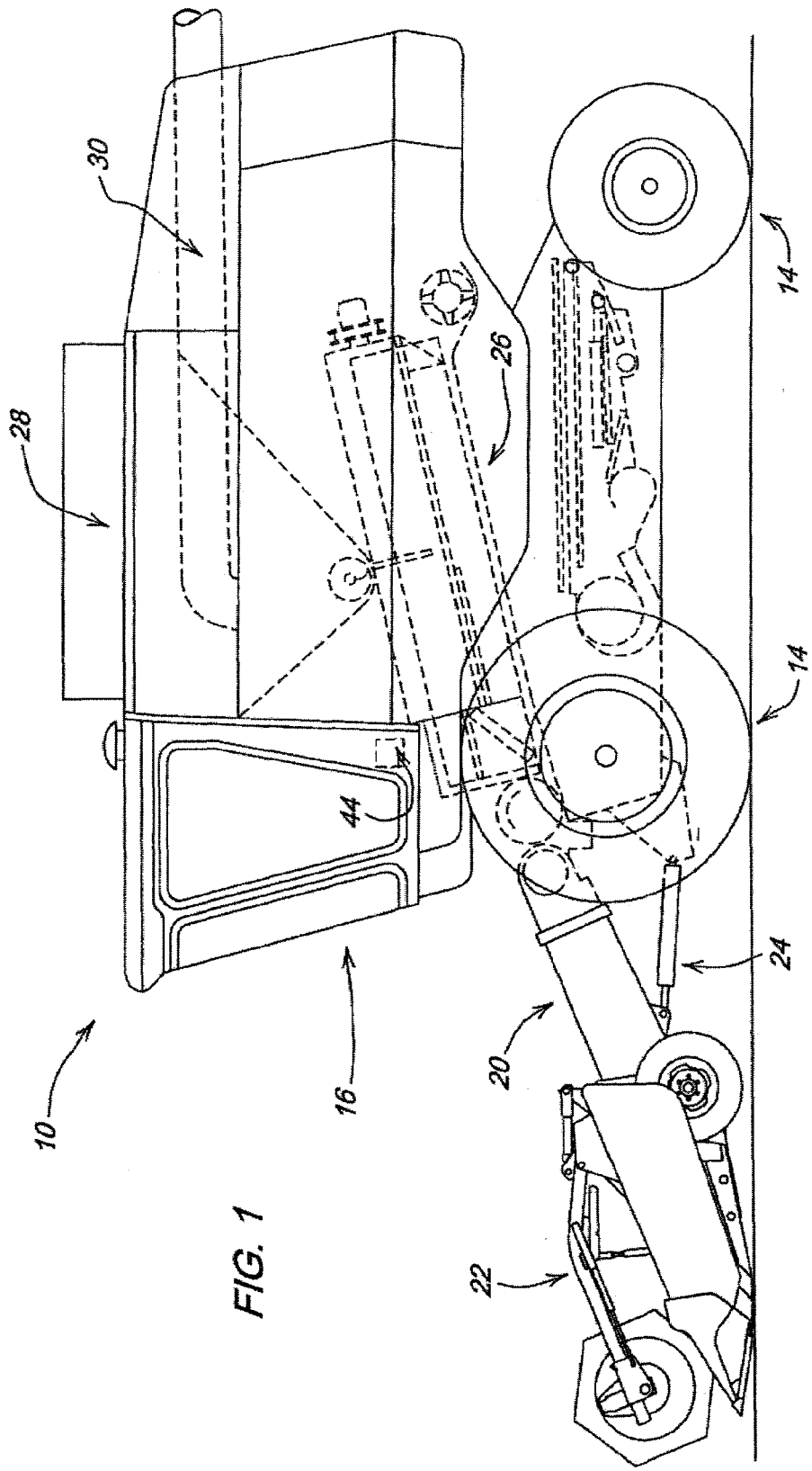
FIG. 1 is a side-view of a combine, showing a draper platform header.

FIG. 1 illustrates a self-propelled combine 10 commonly used in a grain farming operation to harvest a variety of crops from a field. An onboard engine (not shown) powers the combine 10, while ground engaging wheels 14 support and propel the machine. An operator controls the combine 10 from an operator's station located in a cab 16 at the front of the machine.

A feederhouse 20 pivotally attaches at the front of the combine 10, supporting a header 22 removably attached to the front of the feederhouse 20. A pair of lift cylinders 24 support and articulate the feederhouse 20 from the combine 10, enabling the raising and lowering of the header 22 relative to the ground.

During a harvesting operation, the combine 10 moves forward through the field with the header 22 lowered to a working height. The header 22 cuts and transfers crop material to the feederhouse 20, which in turn transfers the crop material into the combine 10. Once inside the combine, threshing and separating assemblies 26 remove grain from the non-grain crop material and transfer it to a grain tank 28 for temporary holding. Crop material other than grain exits from the rear of the combine 10. An unloading auger 30 transfers the grain from the grain tank 28 to a truck or grain cart for transport, or to another receiving bin for holding. In the following, all references to directions are quoted with respect to the forward direction of combine 10 which extends in FIG. 1 to the left side.

Figure 2:
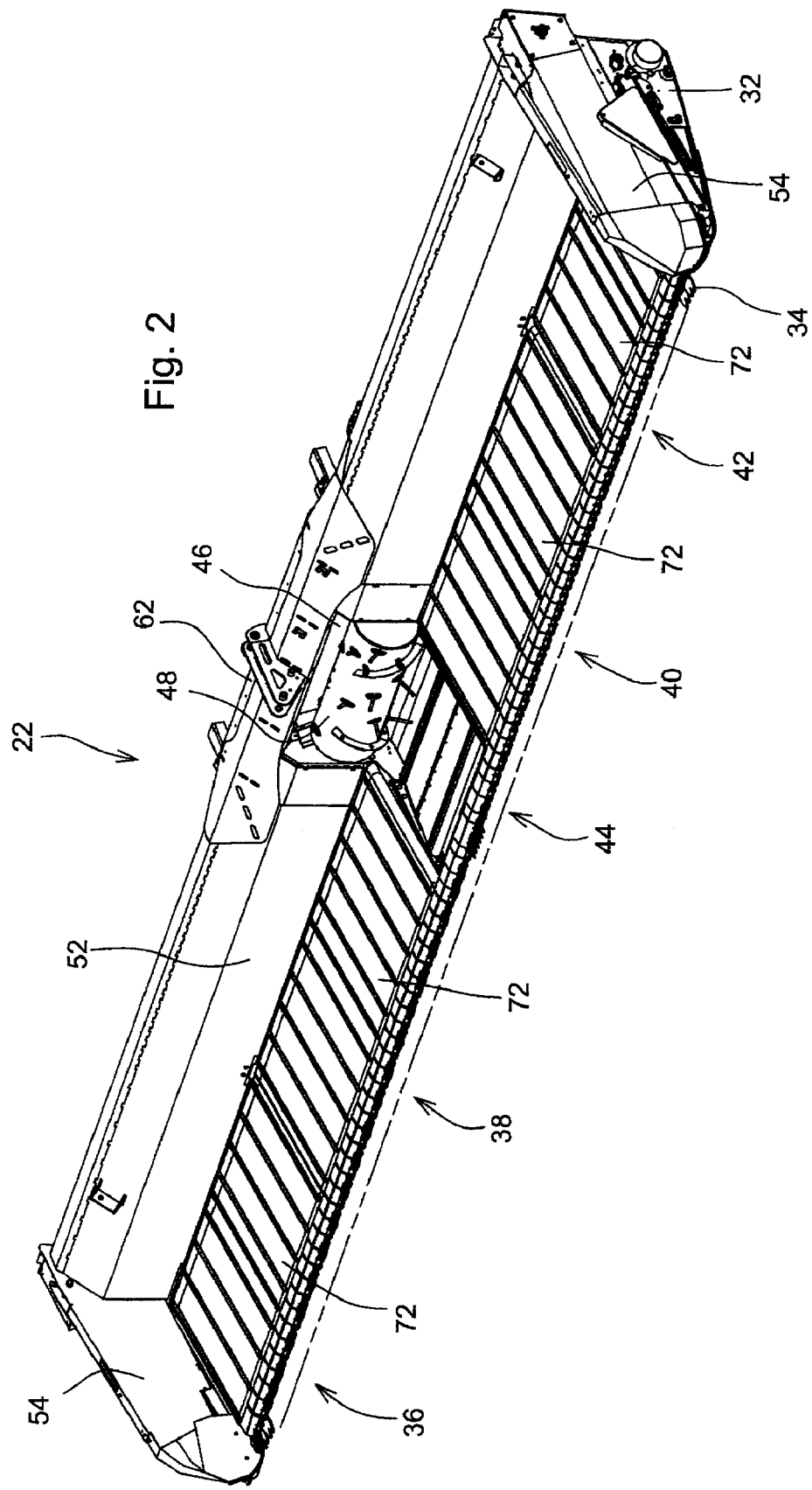
FIG. 2 is a perspective view of the header with the reel removed.

FIG. 2 shows a perspective view of the header 22, which is a draper type header and includes a frame 32 supporting a cutter bar 34 extending over the entire width of header 22, a first transverse conveyor belt assembly 36, a second transverse conveyor belt assembly 38, a third transverse conveyor belt assembly 40, a fourth transverse conveyor belt assembly 42 and a fifth conveyor belt assembly 44. While during operation, the first and second conveyor belt assemblies 36, 38 convey the crop cut by the cutter bar 34 to the left and thus towards the center of header 22, the third and fourth conveyor belt assemblies 40, 42 convey the crop cut by the cutter bar 34 to the right and thus towards the center of header 22, where it is fed by the fifth conveyor belt assembly 44 and an upper transverse drum conveyor 48 with outwardly extending fingers towards a rear exit opening 46 of frame 32 and thus to the feederhouse 20. A reel assembly 50 shown in FIG. 1 is also supported on frame 32 and moves crop standing on the field towards the cutter bar 34. The frame 32 comprises vertically extending rear cover sheets 52 mounted behind the conveyor belt assemblies 36-42, and side walls 54 at both ends.

Figure 3:
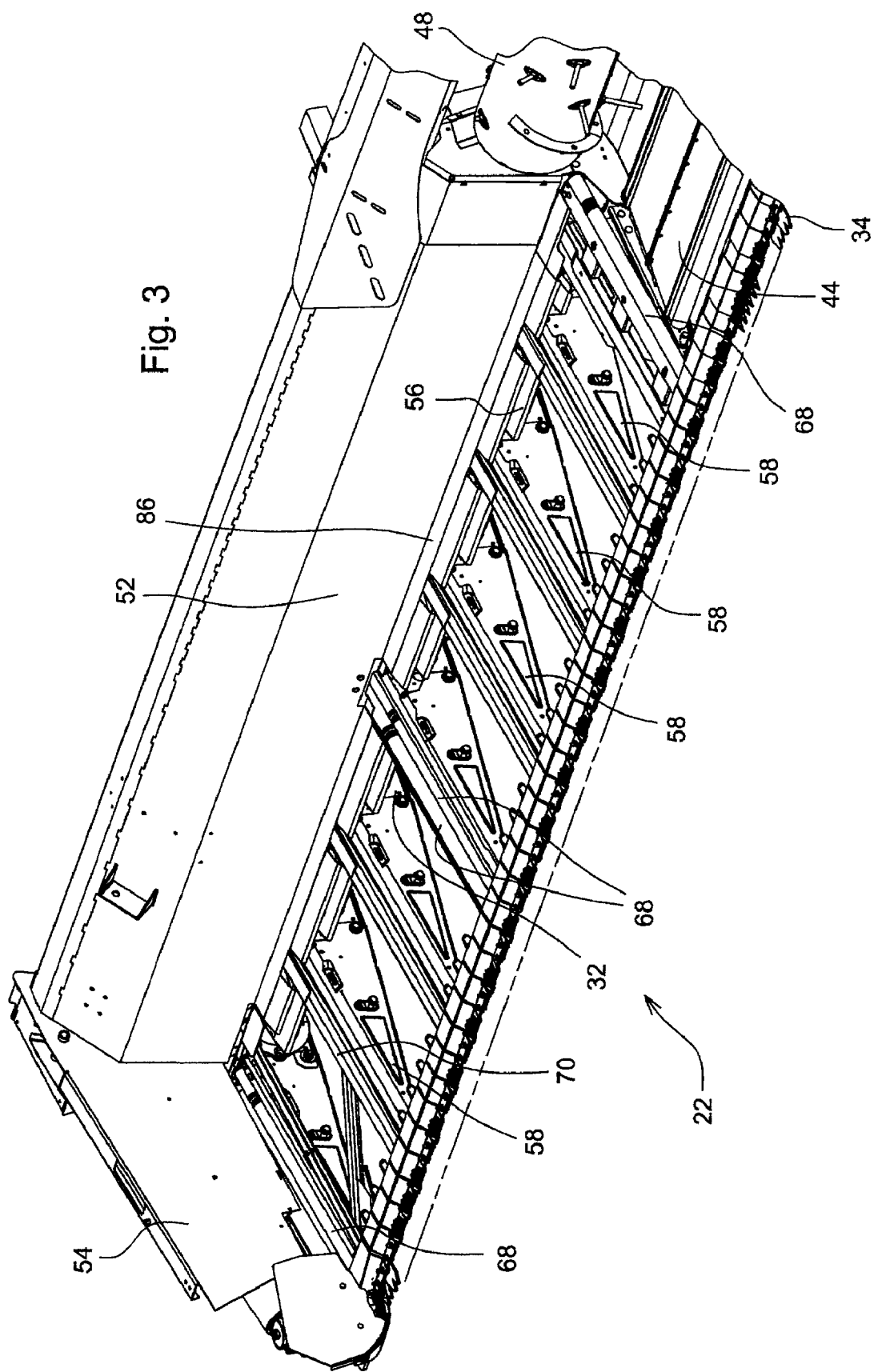
FIG. 3 is a perspective view of the right half of the header, with the conveyor belt assemblies removed.
Figure 4:
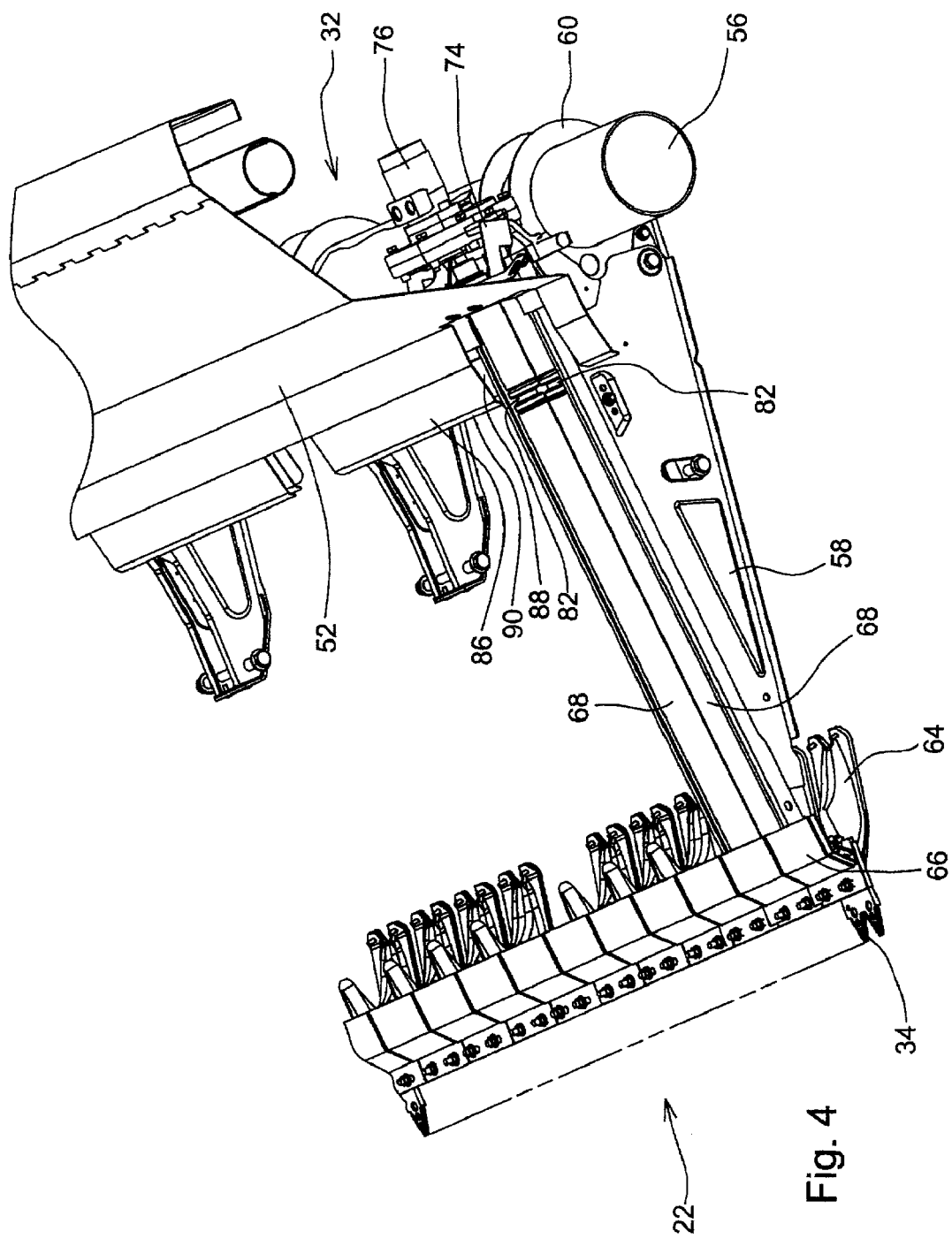
FIG. 4 is a perspective view of the frame of the header, the cutter bar and two deflection rollers for the belts.

As can be seen from FIG. 3, the frame 32 includes a transverse, cylindrical beam 56 with a circular cross section. Beam 56 extends outward from the center portion of the frame of the header 22. The rear cover sheets 52 and the side walls 54 are directly mounted to beam 56, which is supported on the feederhouse 20 by a supporting assembly 62 supporting beam 56 on top of the front portion of the feederhouse 20. The beam 56 further supports a number of forwardly extending support frames 58 distributed over the width of beam 56. The support frames 58 are pivotally mounted to the beam 56 around the longitudinal axis 78 of beam 56 by way of rings 60 enclosing beam 56. The rings 60 are mounted to a respective support frame 58, as shown in FIG. 4. By suitable stops (not shown), the angular range that the support frames 58 can rotate around beam 56 can be restricted. The support frames 58 carry on their front ends the cutter bar 34 as well as lower ground engaging skids 64 and upper crop guides 66 having a vertical front wall and an upper, horizontal wall extending towards the rear beyond the front edges of the conveyor belt assemblies 36-42. The right half of the frame 32 of header 22 comprises in total eight support frames 58.

The outermost support frame 58 mounts a roller 68, while the two succeeding support frames 58 mount stabilization rods 70. The next (fourth seen from the right end) support frame 58 mounts two rollers 68, while the three succeeding support frames 58 also mount stabilization rods 70. The two rollers 68 of the fourth support frame 58 are connected by way of a gearbox 74 to a hydraulic motor 76 driving the two rollers 68. The innermost support frame 58 finally bears a roller 68. The conveyor belt assembly 44 is also supported on the innermost support frame 58, although it might also be independently mounted to beam 56. A first conveyor belt 72 of the first belt assembly 36 runs around the roller 68 mounted to the rightmost support frame 58 and around the outer roller 68 mounted to the fourth (seen from the right end of header 22) support frame 58, while a conveyor belt 72 of the second belt assembly 38 runs around the other roller 68 of this support frame 58 and around the roller 68 of the innermost support frame 58. The conveyor belts 72 also enclose the telescopic stabilization rods 70 mounted on the remaining support frames 58. The conveyor belts 72 include transverse flights. The left half of the header 22 (not shown in FIGS. 3 and 4) is arranged symmetric to its right half.

Figure 5:
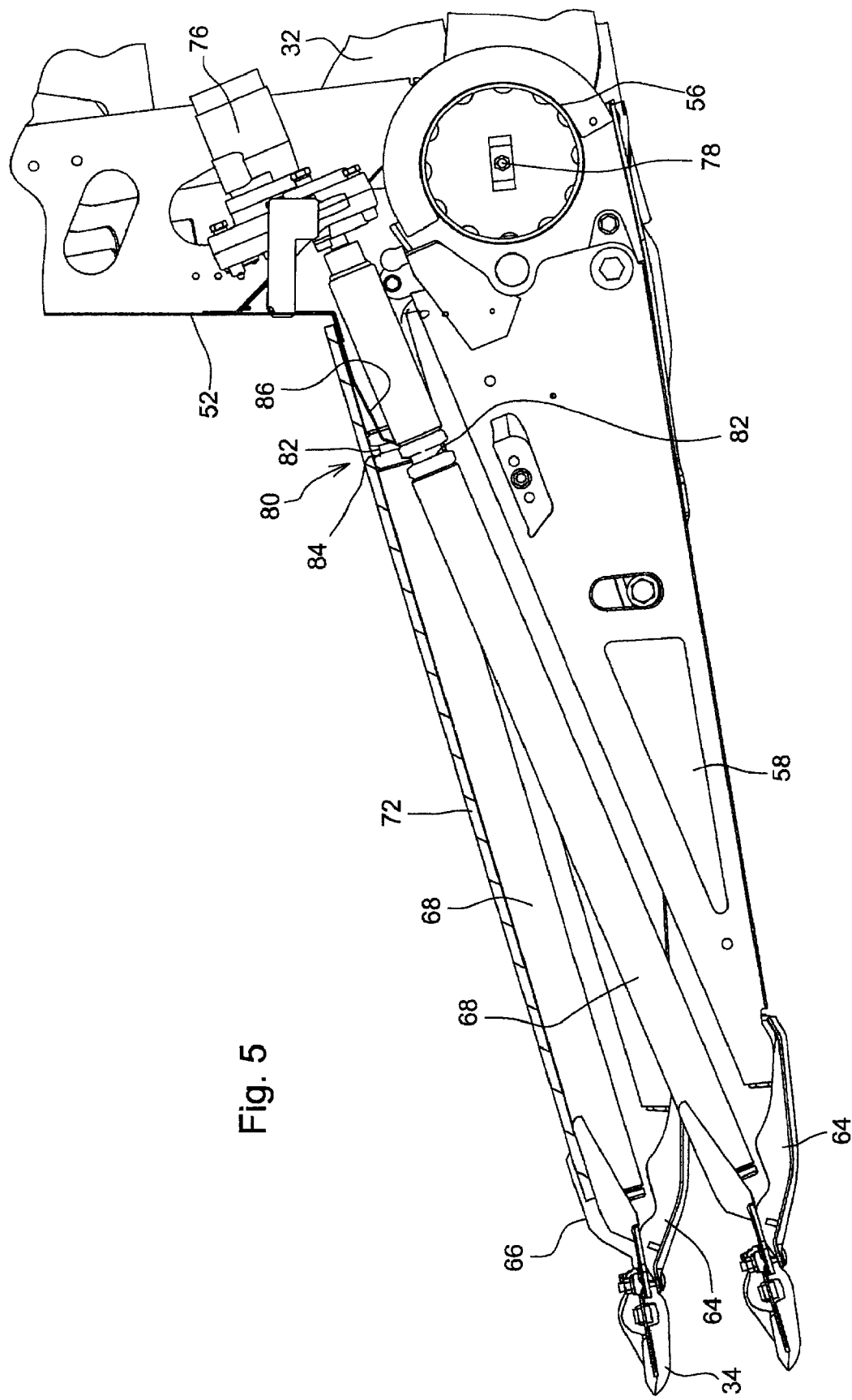
FIG. 5 shows a side-view of the frame and the rollers in two possible positions.

After all, it is apparent that the support frames 58 can individually move in a vertical direction around the longitudinal axis 78 of the beam 56, dependent on the ground contour. Possible end positions of the support frames 58 and of the rollers 68 are schematically indicated in FIG. 5. Since both rollers 68, around which a conveyor belt 72 runs, can move independently, an assembly 80 for guiding the conveyor belt 72 on the rollers 68 is provided, that prevents the conveyor belt 72 from running off the rollers 68. This assembly 80 for guiding the conveyor belt 72 on the rollers 68 includes a recess or groove 82 within the rollers 68 and a ridge 84 on the inner face of the conveyor belt 72, engaging into the groove 82. The assembly 80 for guiding the conveyor belt 72 on the rollers 68 is located at about ⅕ of the length of the roller 68 in the vicinity of its rear end. This location has the advantage of being relatively close to the rotation axis 78 and thus having only a limited vertical movement range, such that the assemblies 80 of both rollers 68 supporting one conveyor belt 72 have a sufficiently small relative movement range, thereby avoiding that the conveyor belt 72 runs off the rollers 68, and also providing a flange 86 extending horizontally and forwardly from the lower edge of the rear cover sheets 52 and abutting the inner surface of the conveyor belt 72 over a sufficient length to prevent entry of crop and residues into the interior of the belt assemblies 36-42. The flanges 86 have cutouts 88 in the area of the rollers 68. While they are only indicated schematically in FIG. 5, it can be seen from FIG. 4 that the flanges 86 extend forward to the ridge 84 of the conveyor belt 72, such that the ridge 84 abuts a vertical end range 90 of the flange 86, preventing entry of crop and residue into the interior of the belt assemblies 36-42. Since the conveyor belts 72 move relative to axis 78, while the rear cover sheets 52 and the flanges 86 are rigidly mounted to frame 32, the flanges 86 have a convex curved upper surface, allowing a continuous contact with the interior of the conveyor belt 72.

Having described the preferred embodiment, it will become apparent that various modifications can be made without departing from the scope of the invention as defined in the accompanying claims.

What is claimed is:

1. In a draper platform, a transverse conveyor assembly comprising two rollers, a conveyor belt surrounding both rollers, and an assembly for guiding the conveyor belt on the rollers consisting solely of a ridge and a groove, each of the rollers being mounted to a respective support frame, the support frames independently pivotally mounted to a frame of the platform around a transverse axis at their rear ends, the assembly provided in the vicinity of the rear end of the rollers.

2. The assembly described in claim 1 wherein the ridge is provided on an inner surface of the conveyor belt and the groove is an annular groove provided within the roller.

3. The assembly described in claim 1 wherein the frame supports a horizontally extending flange abutting the inner surface of the conveyor belt.

4. The assembly described in claim 3 wherein the flange extends from a rear cover of the frame to the assembly.

5. The assembly described in claim 4 wherein the flange comprises a vertical end range terminating adjacent to the ridge on the conveyor belt.

6. A draper platform comprising a frame, a cutter bar, at least one transverse conveyor assembly comprising two rollers and a conveyor belt surrounding both rollers, each of the rollers mounted to a respective support frame that is independently pivotally mounted to the frame around a transverse axis at its rear end, and an assembly for guiding the conveyor belt on the rollers, the assembly for guiding the conveyor belt on the rollers consisting solely of a ridge on an interior side of the belt and a groove within the roller, the assembly provided in the vicinity of the rear end of the rollers.

7. The draper platform described in claim 6 wherein the ridge is provided on an inner surface of the conveyor belt and the groove is an annular groove provided within the roller.

8. The draper platform in claim 7 wherein each of the rollers is mounted to a respective support frame, the support frames independently pivotally mounted to a frame of the platform around a transverse axis at their rear ends, and the assembly provided in the vicinity of the rear end of the rollers.

9. The draper platform described in claim 6 wherein the frame supports a horizontally extending flange abutting the inner surface of the conveyor belt, the flange comprising a vertical end range abutting the ridge on the conveyor belt.

10. A transverse conveyor belt for use in a draper platform, the conveyor belt arranged to surround two rollers and having a ridge on an interior side, the ridge configured to engage into a first groove in a first roller and into a second groove of a second roller, the ridge on the conveyor belt configured to coact with the first and second grooves and define therewith an assembly for solely guiding the conveyor belt on the rollers, both rollers provided on a draper platform that comprises a frame, a cutter bar and the two rollers that are mounted to a respective support frame that is independently pivotally mounted to the frame around a transverse axis at its rear end, the groove and mating ridge provided in the vicinity of the rear end of the respective roller.

11. The conveyor belt described in claim 10 wherein the ridge is provided on an inner surface of the conveyor belt and the groove is an annular groove provided within the roller.

12. The conveyor belt in claim 11 wherein each of the rollers is mounted to a respective support frame, the support frames independently pivotally mounted to a frame of the platform around a transverse axis at their rear ends, and the assembly provided in the vicinity of the rear end of the rollers.

* * * * *